(12) United States Patent
Meguro et al.

(10) Patent No.: US 7,550,225 B2
(45) Date of Patent: Jun. 23, 2009

(54) BATTERY

(75) Inventors: Takeshi Meguro, Fukushima (JP);
Yoshihiro Dokko, Fukushima (JP)

(73) Assignee: Sony Corporation, Tokyo (JP)

( * ) Notice: Subject to any disclaimer, the term of this patent is extended or adjusted under 35 U.S.C. 154(b) by 10 days.

(21) Appl. No.: 11/625,894

(22) Filed: Jan. 23, 2007

(65) Prior Publication Data
US 2008/0107957 A1    May 8, 2008

(30) Foreign Application Priority Data
Jan. 27, 2006   (JP)   ............................ P2006-019056

(51) Int. Cl.
*H01M 2/12*   (2006.01)
(52) U.S. Cl. ................. 429/56; 429/7; 429/82
(58) Field of Classification Search ............. 429/53, 429/56, 7, 72, 82, 163
See application file for complete search history.

(56) References Cited

U.S. PATENT DOCUMENTS 4,581,304 A * 4/1986 Beatty et al. ............ 429/56

7,214,445 B2 * 5/2007 Miyaki ................. 429/218.1
2006/0115736 A1 * 6/2006 Hashimoto et al. ......... 429/246

FOREIGN PATENT DOCUMENTS

| JP | 2001-210384 | 8/2001 |
|---|---|---|
| JP | 2004-111105 | 4/2004 |

* cited by examiner

*Primary Examiner*—Patrick Ryan
*Assistant Examiner*—Monique Wills
(74) *Attorney, Agent, or Firm*—Sonnenschein Nath & Rosenthal LLP

(57) ABSTRACT

A battery capable of preventing deformation thereof when gas is generated is provided. In the battery, a safety valve is electrically connected to a battery element, and an insulating plate is arranged between the battery element and the safety valve. The safety valve has a plurality of vent holes around a central portion thereof. The insulating plate has seven or more openings in the circumferential direction in a position where the openings can face to the vent holes of the safety valves around a central portion thereof.

7 Claims, 8 Drawing Sheets

BATTERY

CROSS REFERENCES TO RELATED APPLICATIONS

The present invention contains subject matter related to Japanese Patent Application JP 2006-19056 filed in the Japanese Patent Office on Jan. 27, 2006, the entire contents of which being incorporated herein by reference.

BACKGROUND OF THE INVENTION

1. Field of the Invention

The present invention relates to a battery in which a safety valve is electrically connected to a battery element and an insulating plate is arranged between the battery element and the safety valve.

2. Description of the Related Art

In recent years, many portable electronic devices such as combination cameras (videotape recorders), digital still cameras, mobile phones, personal digital assistances, and notebook-sized personal computers have been introduced, and their size and weight have been reduced. Accordingly, as an electrical power source for such electronic devices, lightweight secondary batteries capable of providing a high energy density have been developed. Specially, since lithium ion secondary batteries in which a carbon material is used for the anode, a complex material of lithium (Li) and a transition metal is used for the cathode, and ester carbonate is used for the electrolytic solution can provide a high energy density compared to the existing lead batteries and the nickel cadmium batteries, such lithium ion secondary batteries have been in practical use widely.

FIG. 9 is a cross section showing an example of a structure of a lithium ion secondary battery in practical use. In the battery, a battery element 110 in which a cathode 111 and an anode 112 are spirally wound with a separator 113 in between is sandwiched between a pair of insulating plates 171 and 172, and is contained in a battery container 120. A safety valve 130 and a battery cover 150 are arranged at the open portion of the battery container 120 (for example, refer to Japanese Unexamined Patent Application Publication Nos. 2001-210384 and 2004-111105). In the insulating plate 171, a central aperture 171A is provided in the central portion, and a plurality of small openings 171C are provided around the central aperture 171A. The central aperture 171A is provided to derive a lead 115 of the battery element 110 to connect the lead 115 to the safety valve 130, and to let through gas generated in heating or the like to operate the safety valve 130. In addition, the central aperture 171A is used to inject an electrolytic solution into the battery container 120. The peripheral openings 171C are provided mainly to improve injection characteristics of the electrolytic solution to prevent the electrolytic solution from remaining on the insulating plate 171.

SUMMARY OF THE INVENTION

However, in recent years, the energy density has been increased due to improvement in the battery performance, and the amount of gas generated in heating or the like has been increased. Therefore, there has been a disadvantage that the central aperture 171A and the opening 171C provided in the insulating plate 171 of the related art are not able to let through gas sufficiently, leading to deformation of battery. In particular, such a disadvantage has been significant in a case that a high capacity material such as tin (Sn) and silicon (Si) is used for the anode 112.

In view of the foregoing, in the invention, it is desirable to provide a battery capable of preventing the deformation of battery when gas is generated.

According to an embodiment of the invention, there is provided a battery in which a safety valve is electrically connected to a battery element, and an insulating plate is arranged between the battery element and the safety valve. The safety valve has a plurality of vent holes around the central portion thereof. The insulating plate has seven or more openings in the circumferential direction in the position where the openings can face to the vent holes of the safety valve around the central portion thereof.

According to the battery of the embodiment of the invention, the insulating plate is provided with the seven or more openings in the circumferential direction in the position where the openings can face to the vent holes of the safety valve around the central portion of the insulating plate. Therefore, even if the position relation between the opening in the insulating plate and the vent hole of the safety valve is shifted in the circumferential direction, the opposing area thereof can be widened. In the result, when gas is generated, the gas can quickly pass over therethrough, and thus deformation of the battery can be prevented.

In particular, when an anode contains an anode active material which can insert and extract an electrode reactant and contains at least one of metal elements and metalloid elements as an element, for example, contains a material containing at least one of tin and silicon as an element, the battery energy density is high and the generation amount of gas is high. Therefore, higher effects can be obtained.

Further, when the number of the opening in the circumferential direction is nine or less, or the distance between each of the openings in the circumferential direction is 0.1 mm or more, or the size of each of the openings is in the range from 0.78 mm$^2$ to 7.1 mm$^2$, the strength of the insulating plate can be secured while securing the gas passing characteristics.

Other and further objects, features and advantages of the invention will appear more fully from the following description.

DETAILED DESCRIPTION OF THE PREFERRED EMBODIMENT

An embodiment of the invention will be hereinafter described in detail with reference to the drawings.

Figure 1:
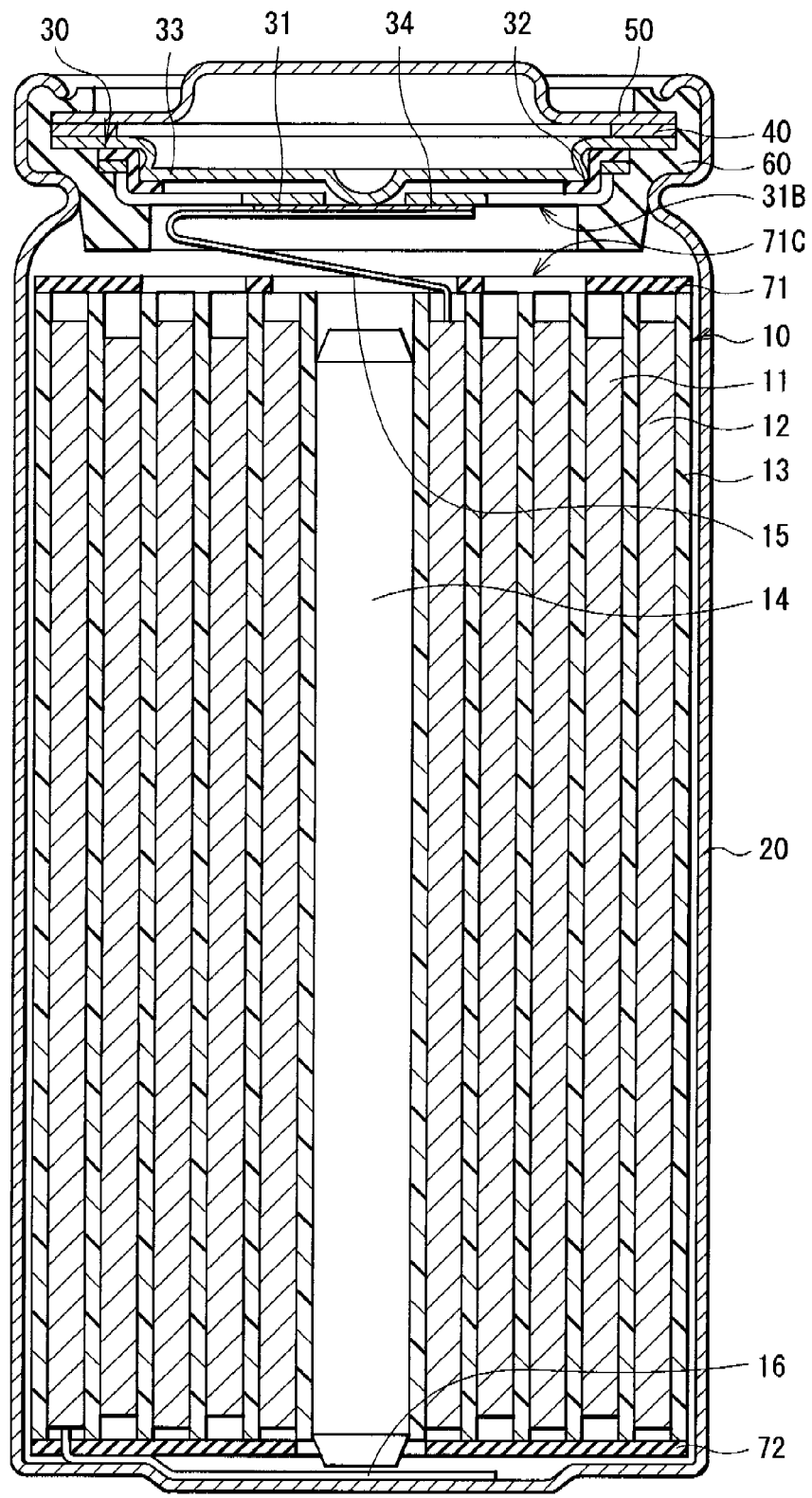
FIG. 1 is a cross section showing a structure of a secondary battery according to an embodiment of the invention.
Figure 2:
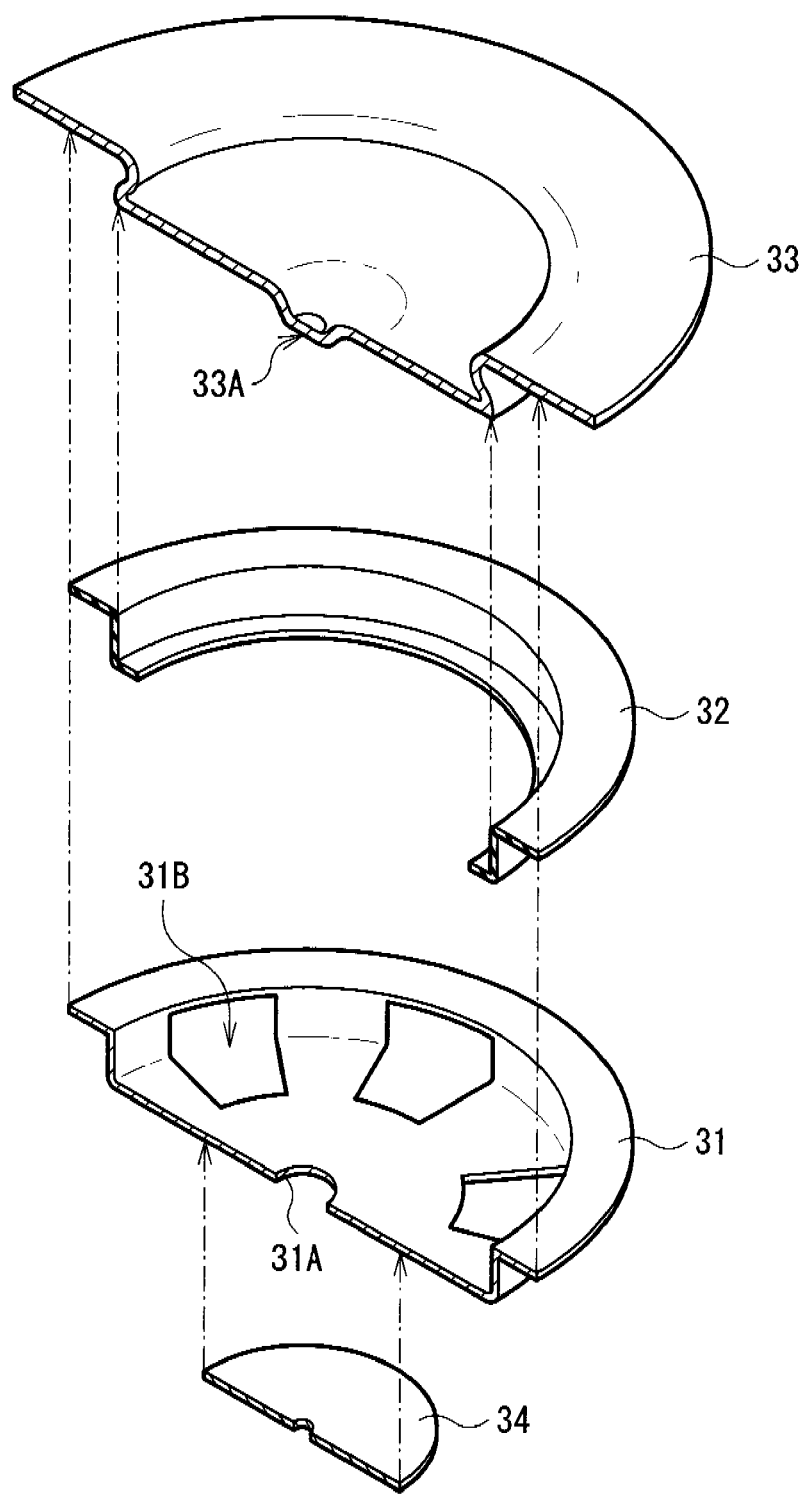
FIG. 2 is a partial cross-sectional exploded perspective view showing a structure of a safety valve shown in FIG. 1.
Figure 3:
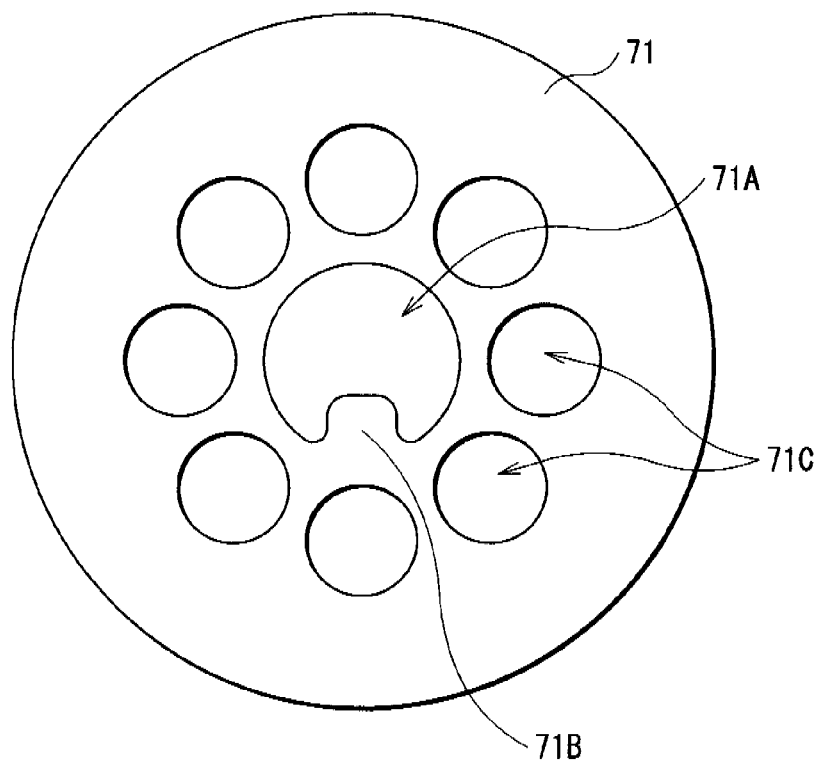
FIG. 3 is a plan view showing a structure of an insulating plate shown in FIG. 1.

FIG. 1 shows a cross section of a secondary battery according to an embodiment of the invention. FIG. 2 shows an exploded view of a safety valve shown in FIG. 1. FIG. 3 shows a planar structure of an insulating plate shown in FIG. 1. The secondary battery is a so-called cylinder type battery, and contains a battery element 10 in a battery container 20 in a shape of an approximately hollow cylinder. The battery element 10 has a structure in which, for example, a strip-shaped cathode 11 and a strip-shaped anode 12 are layered and spirally wound with a separator 13 in between. For example, a center pin 14 is inserted in the center of the battery element.

In the cathode 11, for example, a cathode active material layer is provided on the both faces of a cathode current collector made of an aluminum (Al) foil or the like. The cathode current collector is attached with a lead 15 made of aluminum or the like. The cathode active material layer contains, for example, as a cathode active material, one or more cathode materials capable of inserting and extracting lithium as an electrode reactant. If necessary, the cathode active material layer may contain an electrical conductor and a binder. As a cathode material capable of inserting and extracting lithium, for example, a complex oxide containing lithium and a transition metal element or a phosphate compound containing lithium and a transition metal element can be cited. In particular, a compound which contains at least one of cobalt (Co), nickel (Ni), manganese (Mn), and iron (Fe) is preferable, since such a compound can provide a high capacity. The chemical formula thereof is expressed by, for example, $Li_xMIO_2$ or $Li_yMIIPO_4$. In the formula, MI and MII represent one or more transition metal elements. The values of x and y vary according to the charge and discharge state of the battery, and are generally in the range of $0.05 \leq x \leq 1.10$ and $0.05 \leq y \leq 1.10$.

In the anode 12, for example, an anode active material layer is provided on the both faces of an anode current collector made of a copper (Cu) foil or the like. The anode current collector is attached with a lead 16 made of copper or the like. The anode active material layer contains, for example, an anode active material, and may contain other material such as an electrical conductor and a binder if necessary. As an anode active material, for example, an anode material which can insert and extract lithium as an electrode reactant and which contains at least one of metal elements and metalloid elements as an element can be cited. Such an anode material is preferably used, since a high energy density can be thereby obtained. The anode material may be a simple substance, an alloy, or a compound of a metal element or a metalloid element, or a material having one or more phases thereof at least in part. In the invention, the alloy includes an alloy containing one or more metal elements and one or more metalloid elements, in addition to an alloy including two or more metal elements. Further, the alloy may contain a nonmetallic element. The texture thereof may be a solid solution, a eutectic crystal (eutectic mixture), an intermetallic compound, or a texture in which two or more thereof coexist.

As a metal element or a metalloid element composing the anode material, for example, a metal element or a metalloid element capable of forming an alloy with lithium can be cited. Specifically, magnesium (Mg), boron (B), aluminum, gallium (Ga), indium (In), silicon, germanium (Ge), tin, lead (Pb), bismuth (Bi), cadmium (Cd), silver (Ag), zinc (Zn), hafnium (Hf), zirconium (Zr), yttrium (Y), palladium (Pd), platinum (Pt) or the like can be cited.

Specially, the anode material containing a metal element or a metalloid element in Group 14 in the long period periodic table as an element is preferable. The anode material containing at least one of silicon and tin as an element is particularly preferable. Silicon and tin have a high ability to insert and extract lithium, and provide a high energy density. Specifically, for example, a simple substance, an alloy, or a compound of silicon, a simple substance, an alloy, or a compound of tin, or a material having one or more phases thereof at least in part can be cited.

In particular, as the anode material, a CoSnC-containing material which contains tin, cobalt, and carbon (C) as an element, or an FeSnC-containing material which contains tin, iron, and carbon as an element is preferable. Thereby, a high energy density can be obtained, and superior cycle characteristics can be obtained. The CoSnC-containing material has a phase containing tin, cobalt, and carbon, and the phase preferably has a low crystalline structure or an amorphous structure. Similarly, the FeSnC-containing material has a phase containing tin, iron, and carbon, and the phase preferably has a low crystalline structure or an amorphous structure. Further, in the CoSnC-containing material and the FeSnC-containing material, at least part of carbon as an element is preferably bonded to the metal element or the metalloid element as other element. Lowering of the cycle characteristics may be caused by cohesion or crystallization of tin or the like. Such cohesion or crystallization can be prevented when carbon is bonded to other element. The CoSnC-containing material and the FeSnC-containing material may further contain other element if necessary.

As an anode active material, a carbon material such as natural graphite, artificial graphite, non-graphitizable carbon, and graphitizable carbon may be used. These carbon materials are preferably used, since superior cycle characteristics can be thereby obtained. Further, as an anode active material, lithium metal can be cited as well. One of the foregoing anode active materials may be used singly, or two or more thereof may be used by mixing.

The separator 13 includes, for example, a porous film made of a polyolefin material such as polypropylene and polyethylene, or a porous film made of an inorganic material such as a ceramic nonwoven. The separator 13 may have a structure in which two or more foregoing porous films are layered.

The separator 13 is impregnated with, for example, an electrolytic solution as a liquid electrolyte. The electrolytic solution contains, for example, a solvent and an electrolyte salt. As a solvent, for example, a nonaqueous solvent such as propylene carbonate, ethylene carbonate, diethyl carbonate, dimethyl carbonate, 1,2-dimethoxyethane, 1,2-diethoxyethane, γ-butyrolactone, tetrahydrofuran, 2-methyl tetrahydrofuran, 1,3-dioxolane, 4-methyl-1,3-dioxolane, diethyl ether, sulfolane, methylsulfolane, acetonitrile, propionitrile, anisole, ester acetate, ester butyrate, and ester propionate can be cited. As an electrolyte salt, for example, $LiPF_6$, $LiBF_4$, $LiClO_4$, $LiAsF_6$, $LiB(C_6H_5)_4$, $CH_3SO_3Li$, $CF_3SO_3Li$, $(CF_3SO_2)_2NLi$, $(CF_3SO_2)_3CLi$, $(C_2F_5SO_2)_2NLi$, $LiCl$, and $LiBr$ can be cited. One of the solvents and one of the electrolyte salts may be used singly, or two or more thereof may be used by mixing.

The battery container 20 is made of, for example, nickel-plated iron or stainless steel. One end thereof is closed, and the other end thereof is opened. The lead 16 is welded to the closed portion of the battery container 20, and thereby the closed portion functions as an anode terminal. A safety valve 30, a PTC (Positive Temperature Coefficient) device 40, and a battery cover 50 are attached to the open portion of the battery container 20 by being caulked with a gasket 60. Inside of the battery container 20 is thereby hermetically sealed.

The safety valve 30 has a support plate 31 made of a metal material such as aluminum and an inversion plate 33 made of a metal material such as aluminum arranged on the support plate 31 with an insulating member 32 in between. For example, an opening 31A is provided in the central portion of the support plate 31. A contact plate 34 made of a metal material such as aluminum is jointed to the central portion on the opposite side of the inversion plate 33. The contact plate 34 is electrically connected to the battery element 10 by being welded to the lead 15. Further, for example, a plurality of (for example, six) vent holes 31B are provided around the central portion of the support plate 31. The vent hole 31B is provided to transmit change in the internal pressure of the battery container 20 to the inversion plate 33. The inversion plate 33 includes in the central portion, for example, a protrusion 33A which protrudes to the battery element 10 side. The protrusion 33A is inserted in the opening 31A of the support plate 31 to be contacted with the contact plate 34. Thereby, the inversion plate 33 electrically connects the battery cover 50 to the lead 15 through the PTC device 40, and thus the battery cover 50 functions as a cathode terminal. Further, when increase in the internal pressure of the battery container 20 is transmitted to the inversion plate 33 through the opening 31A of the support plate 31, the inversion plate 33 is deformed to the battery cover 50 side to reduce the increase in the internal pressure and to block the electrical connection with the lead 15 to block the electrical connection between the battery cover 50 and the battery device 10. It is also possible that the contact plate 34 is not provided for the safety valve 30, and the lead 15 is directly contacted with the protrusion 33A of the inversion plate 33.

In the battery container 20, a pair of insulating plates 71 and 72 is arranged to sandwich the battery element 10. The insulating plate 71 is arranged between the battery element 10 and the safety valve 30. The insulating plate 72 is arranged between the battery element 10 and the battery container 20 on the closed portion side of the battery container 20. The insulating plates 71 and 72 are made of plastic such as polypropylene, polyethylene, polyethylene terephthalate, and polyphenylene sulfide. The thickness of the insulating plates 71 and 72 is preferable, for example, in the range from 0.1 mm to 1.0 mm.

The insulating plate 71 has, for example, a central aperture 71A in the central portion. The central aperture 71A is provided to derive the lead 15 and to inject the electrolytic solution into the battery container 20. Further, the central aperture 71A is intended to let through gas in the case that the internal pressure of the battery container 20 is increased. For example, a convex 71B which protrudes toward the central portion is provided in the central aperture 71A in order to prevent the center pin 14 from protruding from the central aperture 71A to damage the lead 15.

Figure 4:
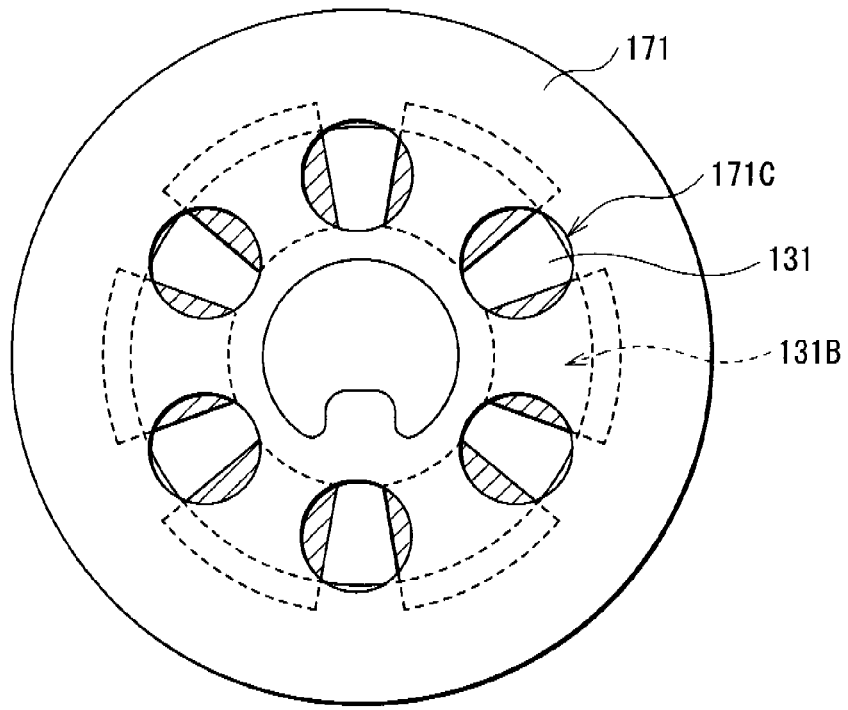
FIG. 4 is a plan view for explaining the opposing area between an opening of the insulating plate and a vent hole of the safety valve.
Figure 5A:
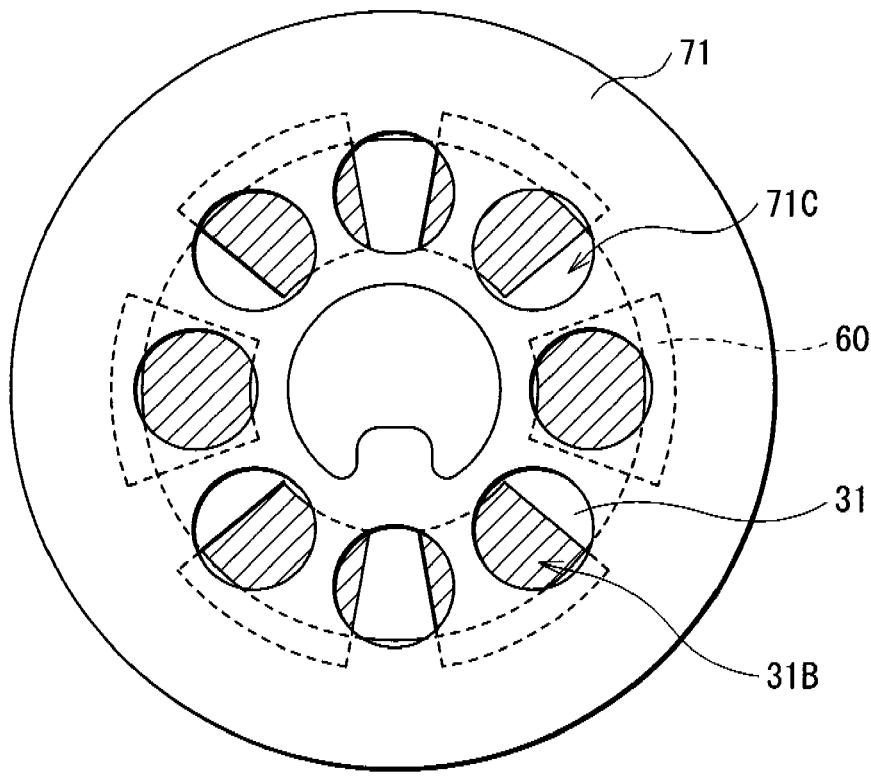
FIGS. 5A and 5B are plan views for explaining the opposing area between the opening of the insulating plate and the vent hole of the safety valve.
Figure 5B:
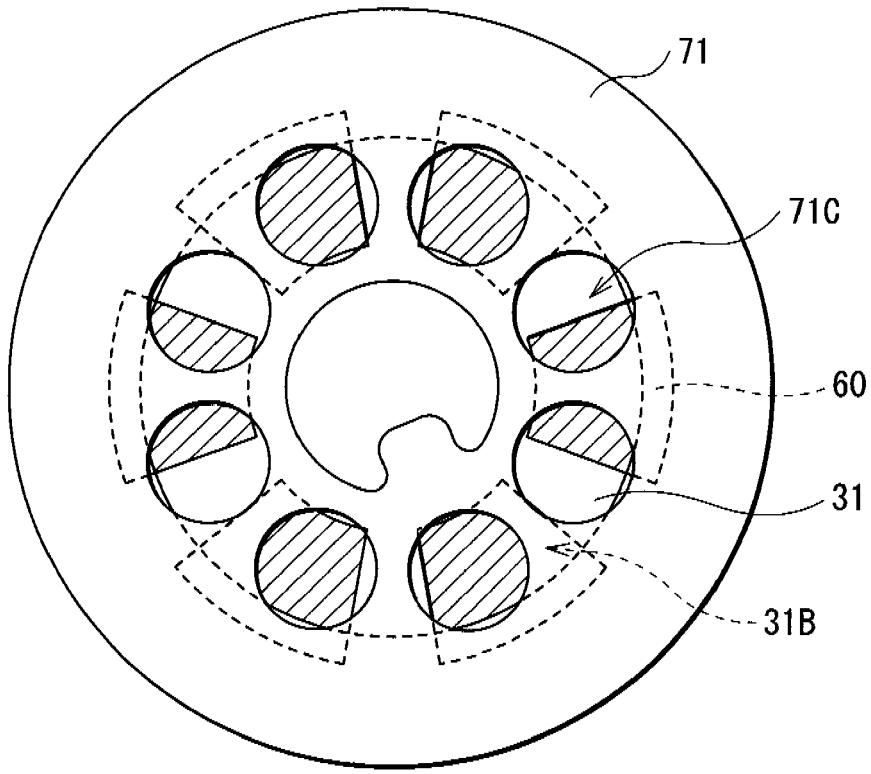

Further, for example, the insulating plate 71 has a plurality of openings 71C around the central portion. The opening 71C is provided to improve injection characteristics when injecting the electrolytic solution, and to more quickly pass over gas when the internal pressure of the battery container 20 is increased. The opening 71C is provided in a position where the opening 71C can face to the vent hole 31B of the safety valve 30, more specifically, in a region opposed to the vent hole 31B when the insulating plate 71 is rotated centering on the central portion of the insulating plate 71. Further, seven or more openings 71C are provided in the circumferential direction. When 6 or less openings 71C are provided, for example, as shown in FIG. 4, the opposing area between the opening 171C of the insulating plate 171 and a vent hole 131B of a support plate 131 becomes narrowed in the case that the position relation thereof is shifted in the circumferential direction. Meanwhile, when seven or more openings 71C are provided, for example, as shown in FIGS. 5A and 5B, the opposing area thereof can be widened even if the position relation thereof is shifted in the circumferential direction. In FIGS. 4, 5A, and 5B, in order to clearly show the opposing region between the openings 71C, 171C of the insulating plates 71, 171 and the vent holes 31B, 131B of the support plates 31, 131, the opposing region is shown by affixing diagonal lines down to the left. FIGS. 3, 5A, and 5B show the case that eight openings 71C are provided as an example. FIGS. 5A and 5B show a state that the insulating plate 71 is rotated by $\pi/8$ rad.

The number of the opening 71C in the circumferential direction is preferably nine or less, and is most preferably eight. When the number thereof is larger than nine, it is difficult to secure the strength of the insulating plate. The distance between each of the openings 71C in the circumferential direction is preferably 0.1 mm or more. The distance between the opening 71C and the central aperture 71A is preferably 0.1 mm or more. When the distance is shorter than the foregoing value, it is difficult to secure the strength of the insulating plate 71. Further, the size of each of the openings 71C is preferably in the range from 0.78 $mm^2$ to 7.1 $mm^2$. When the size is excessively large, it is difficult to secure the strength of the insulating plate 71. Meanwhile, when the size is excessively small, it is difficult to secure passing characteristics of gas, the productivity is lowered, and there is a possibility that the lead 15 enters therein to cause internal short circuit.

FIGS. 3, 5A, and 5B show the case that the opening 71C is separated from the central aperture 71A. However, the opening 71C may be connected to part of the central aperture 71A. However, the opening 71C is preferably separated from the central aperture 71A as shown in FIG. 3. Thereby, there is no possibility that the lead 15 enters therein to cause the internal short circuit, or to cause damage in the lead 15 itself. Further, FIGS. 3, 5A, and 5B show the case that the opening 71C is circle. However, the shape thereof is not limited to the circle, and may be other shape such as a polygon and a fan.

The secondary battery can be manufactured, for example, as follows.

First, for example, a cathode active material, an electrical conductor, and a binder are mixed to prepare a mixture, which is dispersed in a disperse medium. After that, the cathode current collector is coated with the mixture, which is dried, the resultant is compression-molded to form the cathode active material layer and thereby forming the cathode 11. Next, the lead 15 is jointed to the cathode current collector. Further, for example, an anode active material, a binder and the like are mixed to prepare a mixture, which is dispersed in a disperse medium. After that, the anode current collector is coated with the mixture, which is dried, the resultant is compression-molded to form the anode active material layer and thereby forming the anode 12. Next, the lead 16 is jointed to the anode current collector.

Subsequently, the cathode 11 and the anode 12 are layered and spirally wound many times with the separator 13 in between to form a spirally wound electrode body. After that, the center pin 14 is inserted in the center of the spirally wound electrode body. The lead 15 is jointed to the safety valve 30, and the lead 16 is jointed to the battery container 20. The spirally wound electrode body is sandwiched between the insulating plates 71 and 72, and contained in the battery container 20. Next, the electrolytic solution is injected into the battery container 20 from above the insulating plate 71, and impregnated in the separator 13. Subsequently, at the open portion of the battery container 20, the safety valve 30, the PTC device 40, and the battery cover 50 are fixed by being caulked with the gasket 60. The secondary battery according to this embodiment is thereby obtained.

In the secondary battery, when charged, for example, lithium ions are extracted from the cathode 11, and inserted in the anode 12 through the electrolytic solution. When discharged, for example, lithium ions are extracted from the anode 12, and inserted in the cathode 11 through the electrolytic solution. Further, in the secondary battery, in some cases, the electrolytic solution is decomposed due to rise in temperature to cause generation of gas. In particular, when the anode active material which can insert and extract an electrode reactant and which contains at least one of the metal element and the metalloid element as an element is used for the anode 12, the energy density of the battery is high, and thus the generation amount of gas is high. However, in this embodiment, seven or more openings 71C are provided in the circumferential direction in the position where the openings 71C can face to the vent holes 31B of the safety valve 30 around the central portion of the insulating plate 71. As a result, the opposing area between the opening 71C of the insulating plate 71 and the vent hole 31B of the safety valve 30 is widened. As a result, generated gas quickly passes over to operate the safety valve 30, and thus deformation of the battery can be prevented.

As above, according to the embodiment, seven or more openings 71C are provided in the circumferential direction in the position where the openings 71C can face to the vent holes 31B of the safety valve 30 around the central portion of the insulating plate 71. Therefore, even if the position relation between the opening 71C of the insulating plate 71 and the vent hole 31B of the safety valve 30 is shifted in the circumferential direction when assembling the battery or the like, the opposing area thereof can be widened. In the result, when gas is generated, the gas can quickly pass over to operate the safety valve 30, and thus deformation of the battery can be prevented.

In particular, when the anode 12 contains the anode active material which can insert and extract an electrode reactant and which contains at least one of the metal element and the metalloid element as an element, for example, when the anode 12 contains the material containing at least one of tin and silicon as an element, higher effects can be obtained.

Further, when the number of the opening 71C in the circumferential direction is nine or less, or when the distance between each of the openings 71C in the circumferential direction is 0.1 mm or more and the distance between the opening 71C and the central aperture 71A is 0.1 mm or more, or the size of each of the openings 71C is in the range from 0.78 mm$^2$ to 7.1 mm$^2$, the strength of the insulating plate 71 can be secured while passing characteristics of gas are secured.

EXAMPLES

Further, specific examples of the invention will be hereinafter described in detail.

As Examples 1 to 3, the secondary batteries described in the embodiment were fabricated. First, lithium cobalt oxide (LiCoO$_2$) as a cathode active material, graphite as an electrical conductor, and polyvinylidene fluoride as a binder were mixed. The resultant mixture was dispersed in a disperse medium. Subsequently, the cathode current collector made of an aluminum foil was coated with the mixture, which was dried and compression-molded to form the cathode active material layer and thereby forming the cathode 11. Next, the lead 15 made of aluminum was attached to the cathode current collector.

Further, a CoSnC-containing material as an anode active material, artificial graphite and carbon black as an electrical conductor and an anode active material, and polyvinylidene fluoride as a binder were mixed. The resultant mixture was dispersed in a disperse medium. An anode current collector made of a copper foil was coated with the mixture, which was dried and compression-molded to form an anode active material layer and thereby forming the anode 12. Next, the lead 16 made of nickel was attached to the anode current collector.

The CoSnC-containing material was synthesized by mixing tin-cobalt alloy powder and carbon powder and using mechanochemical reaction. The composition of the synthesized CoSnC-containing material was analyzed. The cobalt content was 29.3 wt %, the tin content was 49.9 wt %, and the carbon content was 19.8 wt %. The carbon content was measured by carbon sulfur analyzer. The cobalt content and the tin content were measured by ICP (Inductively Coupled Plasma) optical emission spectrometry. X-ray diffraction was performed for the CoSnC-containing material. In the result, the diffraction peak having a wide half bandwidth with the diffraction angle $2\theta$ of 1.0 deg or more was observed in the range of the diffraction angle $2\theta=20$ deg to 50 deg. Further, XPS (X-ray photoelectron Spectroscopy) was performed for the CoSnC-containing material. In the result, the C1s peak in the CoSnC-containing material was observed in the region lower than 284.5 eV. That is, it was confirmed that carbon in the CoSnC-containing material was bonded to other element.

Subsequently, the separator 13 made of a microporous polypropylene film was prepared. Then, the cathode 11, the separator 13, the anode 12, and the separator 13 were layered in this order. The resultant was spirally wound many times to form a spirally wound electrode body. After that, the center pin 14 was inserted in the center of the spirally wound electrode body, the lead 15 was jointed to the safety valve 30, and the lead 16 was jointed to the battery container 20. The spirally wound electrode body was sandwiched between the insulating plates 71 and 72, and contained in the battery container 20.

For the insulating plate 71, an insulating plate provided with the central aperture 71A and the plurality of the openings 71C as shown in FIG. 3 was used. The number of the opening 71C, that is, the number thereof in the circumferential direction was seven in Example 1, eight in Example 2, and nine in Example 3. Each opening 71C was a circle with the diameter of about 2 mm and the area of about 3.14 mm$^2$. The distance between each of the openings 71C and the distance between each of the openings 71C and the central aperture 71A was 0.1 mm or more, respectively.

Next, an electrolytic solution was injected into the battery container 20 from above the insulating plate 71. For the electrolytic solution, a solution obtained by dissolving LiPF$_6$ as an electrolyte salt at the content of 1 mol/l in a mixed solvent of 50 volume % of ethylene carbonate and 50 volume % of diethyl carbonate was used. Subsequently, at the open portion of the battery container 20, the safety valve 30, the PTC device 40, and the battery cover 50 were fixed by being caulked with the gasket 60. The secondary batteries of Examples 1 to 3 were thereby obtained.

Figure 6A:
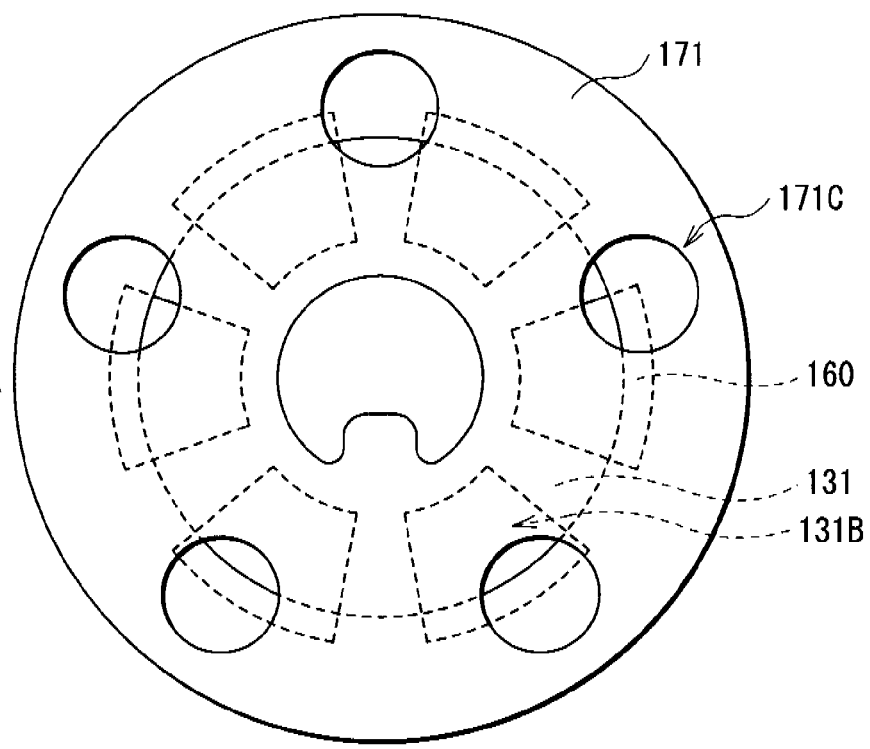
FIGS. 6A and 6B are plan views showing structures of insulating plates used in Comparative examples relative to Examples of the invention.
Figure 6B:
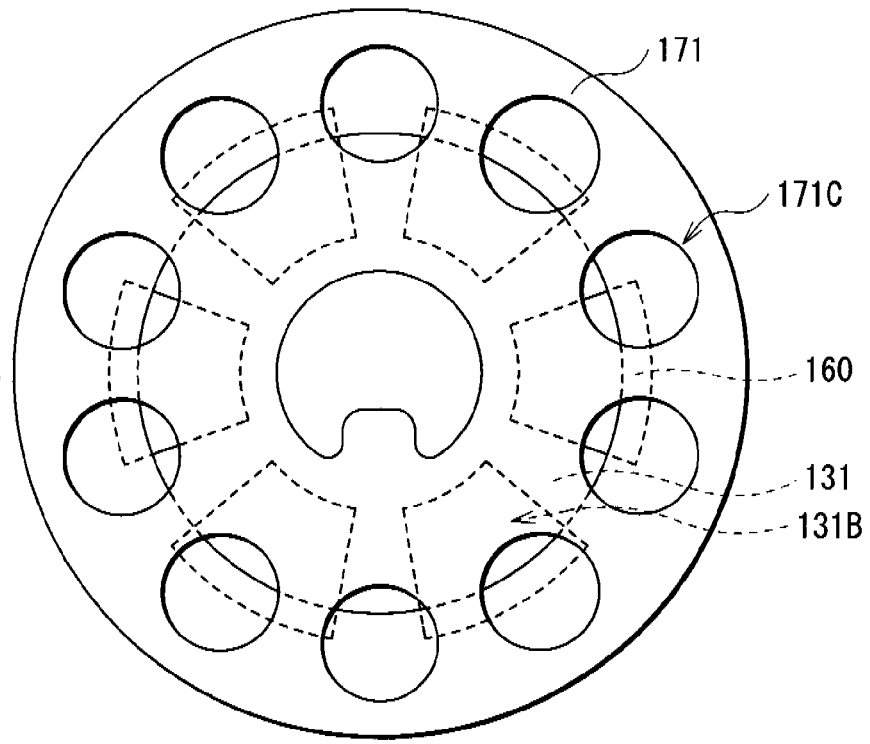

As Comparative examples 1 and 2 relative to these Examples, secondary batteries were fabricated in the same manner as in Examples 1 to 3, except that the opening 171C of the insulating plate 171 was provided on the side more peripheral than in Examples 1 to 3 so that the opening 171C is overlapped with a gasket 160 to narrow the opposing area between the opening 171C and the vent hole 131B of the support plate 131, and the number of the opening 171C was five or ten as shown in FIGS. 6A and 6B. Further, as Comparative example 3, a secondary battery was fabricated in the same manner as in Examples 1 to 3, except that the number of the opening of the insulating plate was five.

Figure 7:
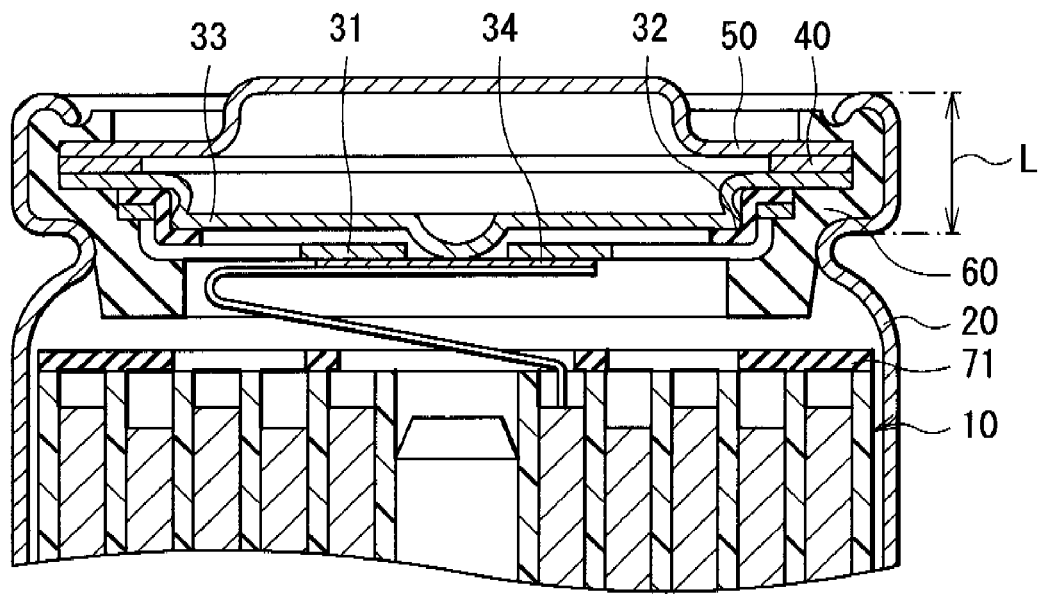
FIG. 7 is a cross section for explaining a crimp margin.

For the fabricated secondary batteries of Examples 1 to 3 and Comparative examples 1 to 3, for each five thereof, fire drop test was performed and the number of exploded batteries was examined. For the unexploded batteries, the deformation of crimp margin L shown in FIG. 7 was examined. The obtained results are shown in Table 1 and FIG. 8. The deformation of crimp margin L shown in Table 1 and FIG. 8 was the average value of the unexploded batteries.

TABLE 1

| | Number of opening in insulating plate (pcs) | Number of exploded batteries (pcs/5 batteries) | deformation of crimp margin (mm) |
|---|---|---|---|
| Example 1 | 7 | 0 | 0.26 |
| Example 2 | 8 | 0 | 0 |
| Example 3 | 9 | 0 | 0 |
| Comparative example 1 | 5 | 2 | 1.16 |
| Comparative example 2 | 10 | 1 | 0.68 |
| Comparative example 3 | 5 | 0 | 0.50 |

Figure 8:
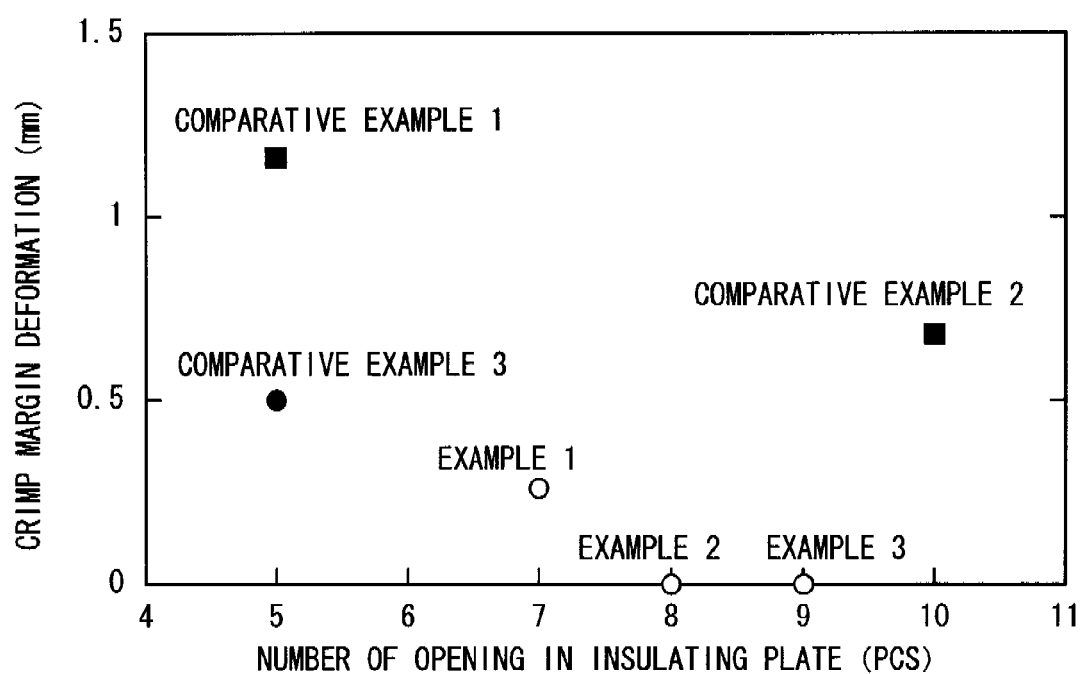
FIG. 8 is a characteristics diagram showing a relation among the position of the opening of the insulating plate, the number thereof, and deformation of the battery.
Figure 9:
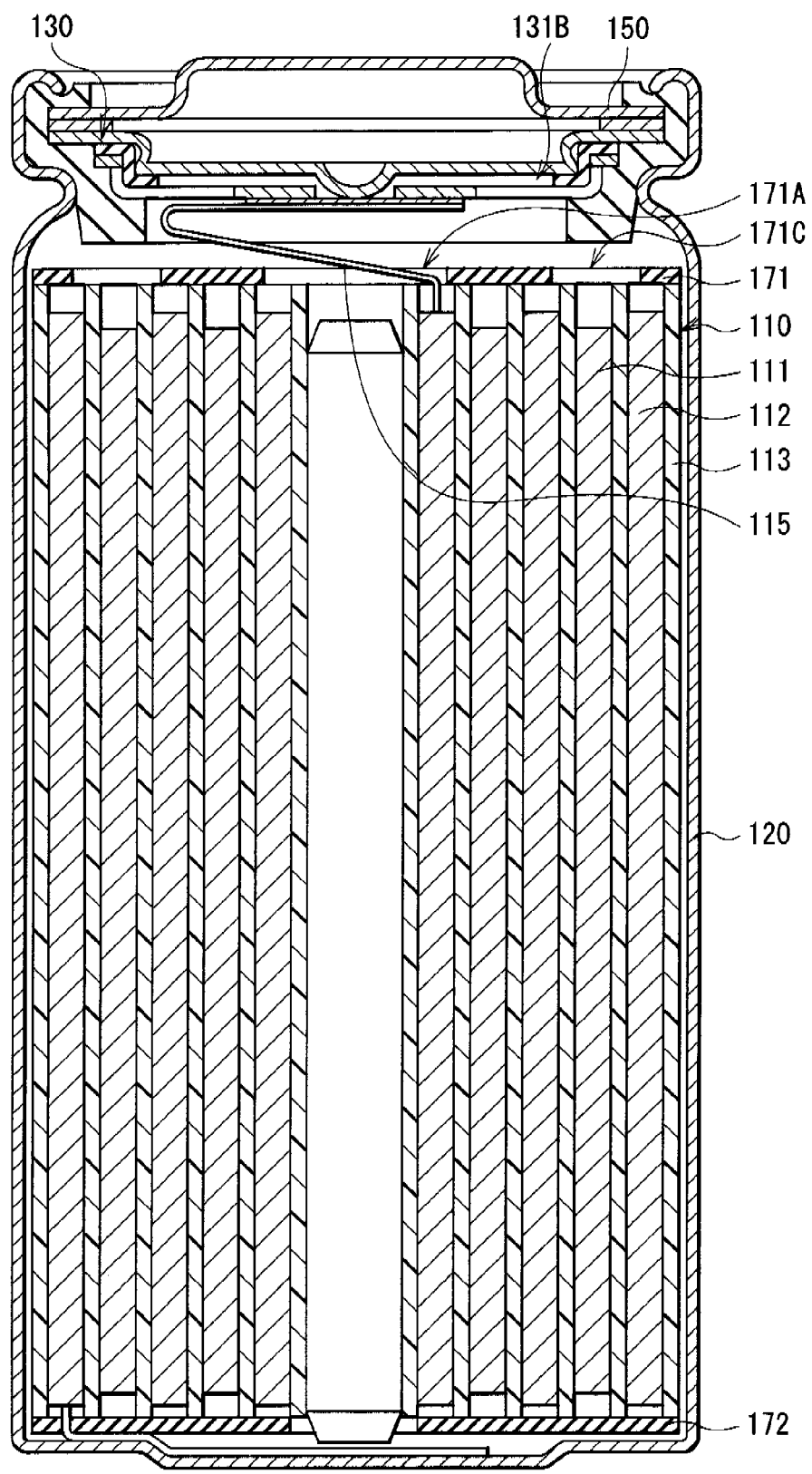
FIG. 9 is a cross section showing a structure of a battery of related art.

As shown in Table 1 and FIG. 8, according to Examples 1 to 3, there were no exploded batteries, and the deformation of crimp margin L was slight. Meanwhile, in Comparative examples 1 and 2 in which the opening of the insulating plate was provided on the periphery side so that the opening was overlapped with the gasket, there were exploded batteries and the deformation of crimp margin L was large. In Comparative example 3 in which the opening in the insulating plate was provided in the position where the opening can face to the vent hole of the safety valve and the number of the opening was five, there was no exploded battery but the deformation of crimp margin L could not be sufficiently decreased.

That is, it was found that when seven or more openings 71C of the insulating plate 71 were provided in the circumferential direction in the position where the openings can face to the vent holes 31B of the safety valve 30, the battery can be prevented from being deformed by quickly letting through gas when the gas is generated.

The invention has been described with reference to the embodiment and the examples. However, the invention is not limited to the embodiment and the examples, and various modifications may be made. For example, in the foregoing embodiment and the foregoing examples, the descriptions have been given of the case using the electrolytic solution as an electrolyte. However, other electrolyte such as a gelatinous electrolyte in which an electrolytic solution is held by a polymer, a polymer solid electrolyte in which an electrolyte salt is dispersed in a polymer, an inorganic solid electrolyte formed of ion conductive ceramics, ion conductive glass, or ionic crystal may be used.

Further, in the foregoing embodiment and the foregoing examples, the descriptions have been given of the battery using lithium as an electrode reactant. However, the invention can be applied to the case using other alkali metal such as sodium (Na) and potassium (K), an alkali earth metal such as magnesium and calcium (Ca), or other light metal such as aluminum.

Furthermore, the invention can be applied not only to the secondary batteries but also to other batteries such as a primary battery similarly.

It should be understood by those skilled in the art that various modifications, combinations, sub-combinations and alternations may occur depending on design requirements and other factors insofar as they are within the scope of the appended claims or the equivalents thereof.

What is claimed is:

1. A battery comprising:
   a battery element including a cathode and an anode;
   a safety valve electrically connected to said battery element said safety valve having a support plate;
   an insulating plate arranged between said battery element and said safety valve;
   an inversion plate on said support plate;
   an insulating member between said inversion plate and said support plate;
   an opening in a central portion of said support plate;
   a contact plate on said central portion at a side opposite of said inversion plate and welded to a lead to form an electrical connection to said battery element;
   a plurality of vent holes to transmit a change in the internal pressure of a battery container to said inversion plate around said central portion of said support plate; and
   a protrusion which protrudes from said central portion to said battery element side inserted in said opening of the support plate and in contact with said contact plate,
   wherein,
   said inversion plate electrically connects said battery cover to the lead through a Positive Temperature Coefficient device,
   said battery cover functions as a cathode terminal when an increase in the internal pressure of said battery container is transmitted to said inversion plate through said opening of the support plate, said inversion plate is deformed towards the battery cover side to reduce the increase in the internal pressure and to block the electrical connection with the lead to block the electrical connection between the battery cover and the battery device, and
   said insulating plate has seven or more openings facing said vent holes in a circumferential direction.

2. The battery according to claim 1, wherein a number of the opening in the circumferential direction is nine or less.

3. The battery according to claim 1, wherein a distance between each of the openings in the circumferential direction is 0.1 mm or more.

4. The battery according to claim 1, wherein a size of each of the openings is in the range from 0.78 mm$^2$ to 7.1 mm$^2$.

5. The battery according to claim 1, wherein the safety valve has a support plate provided with the vent hole and an inversion plate arranged on the support plate with an insulating member in between.

6. The battery according to claim 1, wherein the battery element has a structure in which a cathode and an anode are layered and spirally wound with a separator in between, and the anode contains an anode active material which can insert and extract an electrode reactant and contains at least one of metal elements and metalloid elements as an element.

7. The battery according to claim 6, wherein the anode contains, as the anode active material, a material containing at least one of tin (Sn) and silicon (Si) as an element.

* * * * *